INVENTORS
MANUEL H. GORIN
LUDWIG ROSENSTEIN
BY
ATTORNEY

United States Patent Office 3,213,633
Patented Oct. 26, 1965

3,213,633
SEPARATING COMPONENTS OF A FREEZE CONCENTRATION PROCESS BY AN INTERMEDIATE DENSITY LAYER
Ludwig Rosenstein, 2010 Lyon St., San Francisco, Calif., and Manuel H. Gorin, 57 Corte Ramon, San Rafael, Calif.
Filed July 3, 1961, Ser. No. 121,613
9 Claims. (Cl. 62—58)

This invention relates to a process for removing solvent from solutions. In one embodiment, the process relates to the desalination of sea water by concentration, and recovery of water having a relatively low salt concentration.

It has been proposed to obtain potable water and concentrated salt solution from sea water and brackish water by a process which involves freezing the sea water into ice which is relatively free of dissolved salts, which ice is removed from the sea water and melted to give potable water. One method for obtaining less concentrated salt solutions from sea water by freezing involves freezing the sea water in direct contact with a volatile liquid refrigerant. In order to operate the process with minimum energy input, the refrigerant gas produced in freezing the water is compressed and contacted with the ice (after separation from the brine) to condense and cool the refrigerant for reuse in the freezing operation.

To improve the economics of this process it has been suggested that the incoming sea water to be purified be precooled to near its freezing point prior to being frozen in direct contact with the refrigerant. The preferred method for precooling the incoming saline involves direct contact heat-transfer with a supplemental cooling liquid which is immiscible with the water and which has a vapor pressure such that it will not appreciably volatilize at the temperature and pressures of the heat exchange process.

In the freezing step where the refrigerant vapor is produced to freeze a part of the water, temperatures substantially lower than the freezing point of pure water are encountered. Thus, in the washing and melting of the ice to produce fresh water considerable "cold" may be lost to the system. Further, some energy may be lost in the process because of the necessity of washing the ice produced after partial separation from the residual brine. One serious problem encountered in developing the freezing process has been the lack of an effective method of separating the brine from the ice crystals produced.

It is, therefore, an object of this invention to provide an improved process for purification of solvents by partially freezing the solvent by direct contact with a vaporizable liquid refrigerant. Another object of this invention is to provide a process for effectively separating a portion of solvent from a solution. A further object of this invention is to provide an improved process for obtaining fresh water from the sea.

Figure 1:
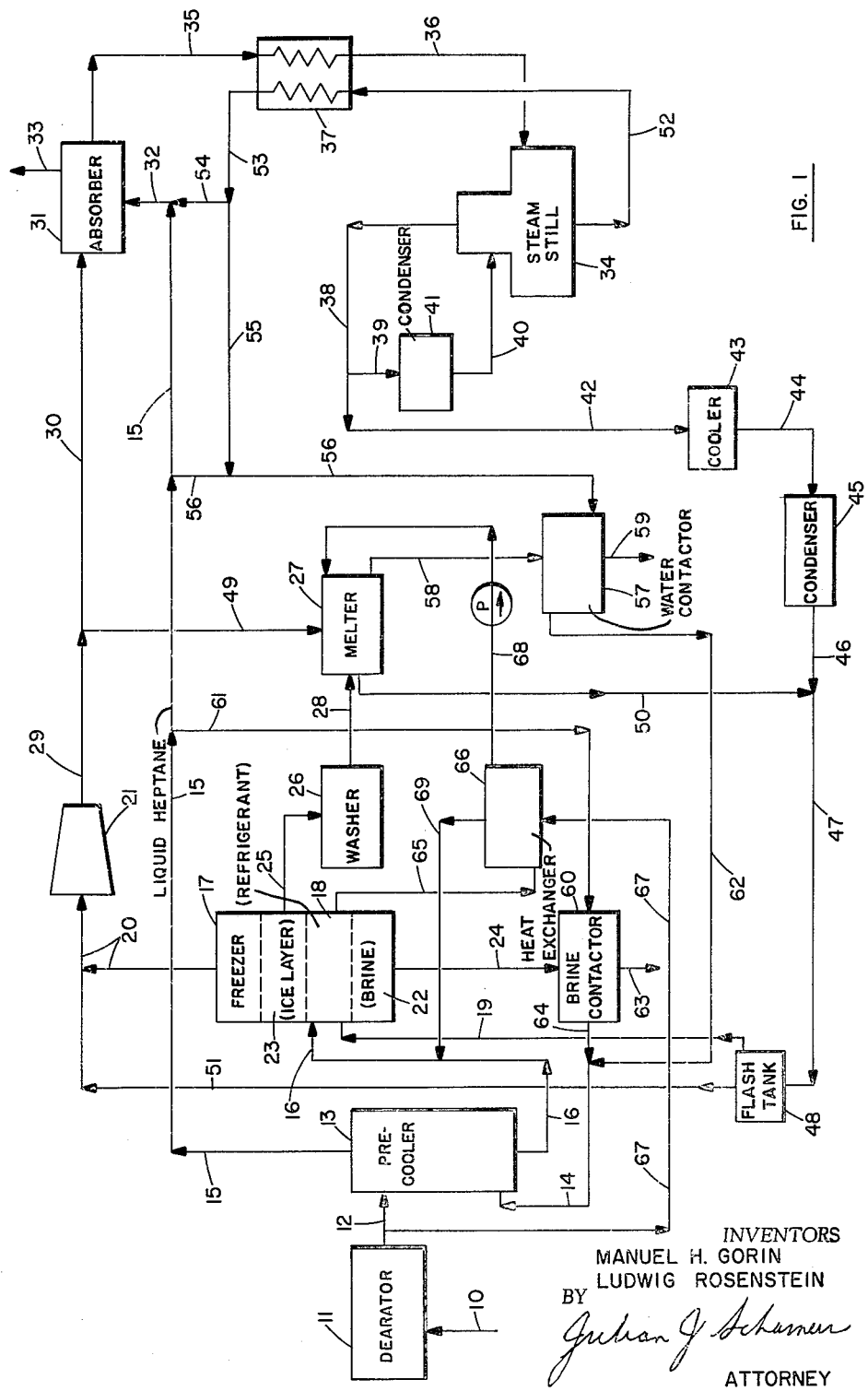
Figure 2:
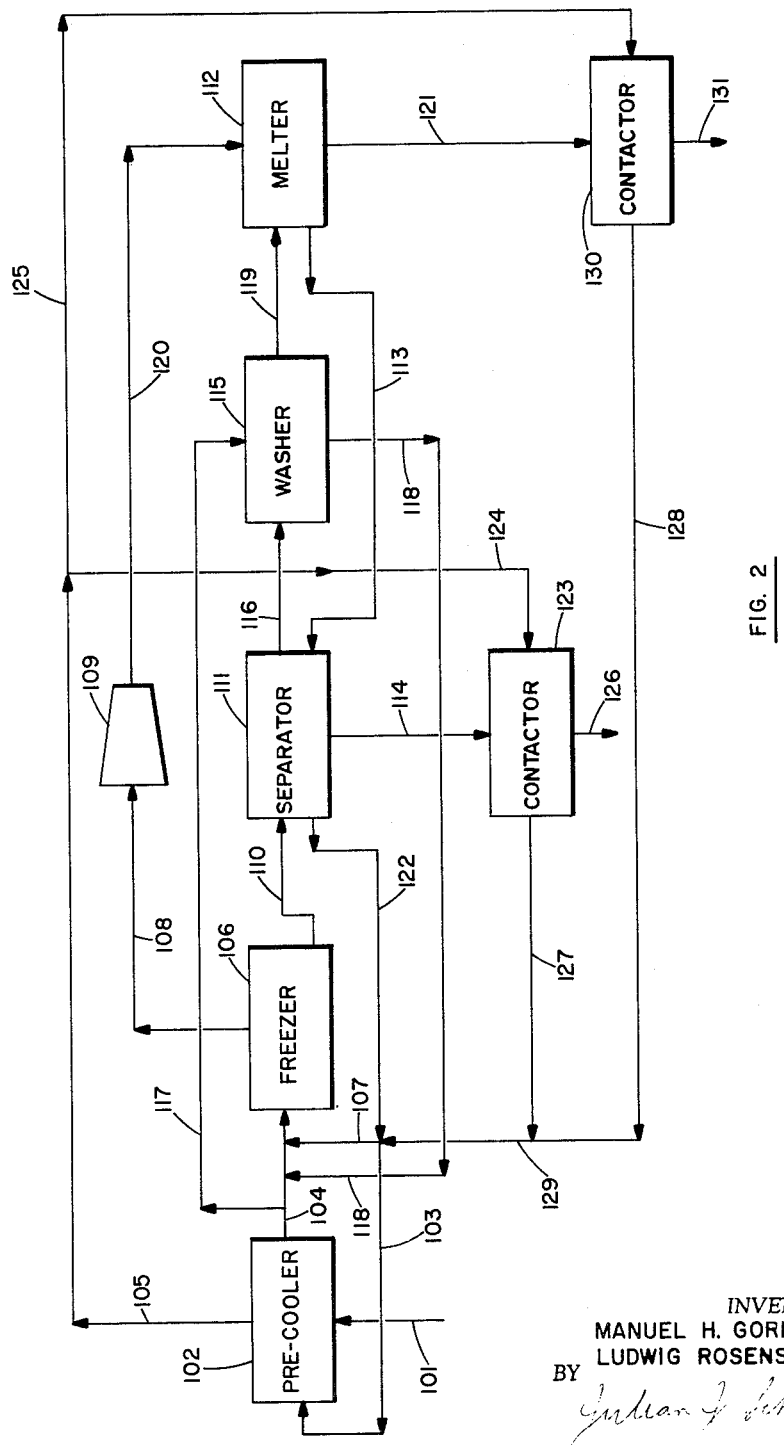
Figure 3:
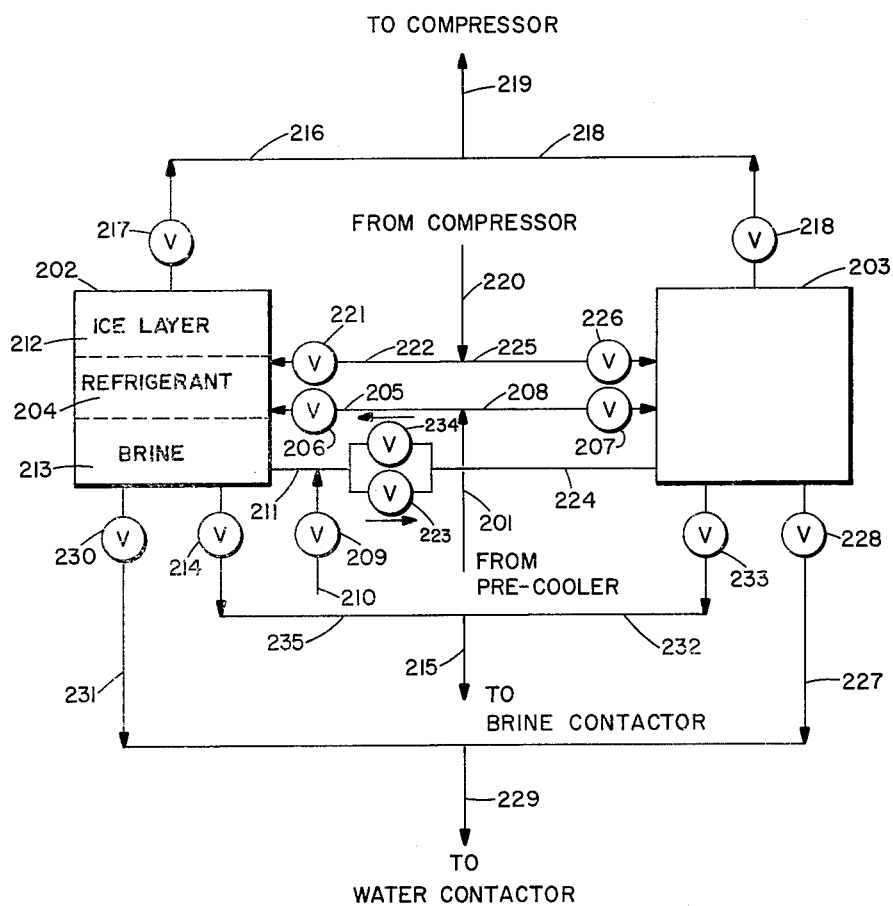

In the drawings accompanying this specification, FIG. 1 is a schematic diagram of a process employing a relatively non-volatile, heat transfer liquid in conjunction with a vaporizable liquid refrigerant according to an embodiment of this invention;

FIG. 2 is a schematic diagram of another process of this invention which employs a refrigerant blend to freeze, melt, cool, and heat exchange; and FIG. 3 illustrates an embodiment of this invention wherein a plurality of similar vessels may be sequentially employed as the freezer-and-melter.

The objects of this invention are accomplished by providing a process for separating less concentrated solution from a relatively more concentrated solution which includes the steps of forming solids in a solution of intermediate concentration by direct contact with a vaporizable liquid refrigerant having a density intermediate that of the solids and the residual solution, separating the solids from residual solution by floatation or gravitation in a body of refrigerant and subsequently forming a liquid from the solids by contacting the solids with compressed refrigerant vapors.

The process of this invention is applicable to systems wherein a component of a solution is separated from the solution by the formation of solids and residual solution by transferring energy from the solution. Thus, the recovery of relatively demineralized water from aqueous solutions such as sea water by partial freezing or by refrigerant hydrate formation, or both, may be effected by the process of this invention. The practice of this invention is applicable whether the solvent, the concentrate, or both, be considered the desired products. The invention is, therefore, applicable to a process for preparing frozen concentrates such as orange juice, concentrated coffee, and beer concentrate. In addition, the application of freezing or solid formation may be employed as a step in the preparation of dehydrated products. Similarly, the process has application to methods for recovering essentially all the solvent from the solution to prepare a solid product.

A preferred embodiment of the invention relates to the recovery of fresh water from saline solutions such as sea water, brackish waters, or other unpotable water containing dissolved material such as inorganic salts. A particularly preferred embodiment is the recovery of water of lowered salt concentration from sea water by partial freezing. In such a process, the incoming sea water is precooled to near its freezing point by one of several methods. The precooling may be accomplished by conventional indirect heat exchange with a cooling medium. It is preferred to accomplish cooling by direct contact with a heat exchange medium which may be the same fluid as is employed as a refrigerant. In a particularly preferred embodiment of this invention, the heat transfer medium has a low solubility for the gaseous components of the sea water and a high solubility for and is different from the particular refrigerant employed. For best results, all direct contact heat exchange is performed by countercurrent flow of the liquids being heat exchanged. After precooling, the sea water is partially frozen in direct contact with the vaporizable liquid refrigerant of intermediate density, thus forming refrigerant vapors, ice, and residual brine. According to the present invention, the residual solution and ice are separated by floating the ice on a layer of refrigerant, while allowing the brine to sink below the refrigerant. After separation, the ice may be washed with additional sea water, which has preferably been precooled, to remove residual more concentrated brine adhering to the ice crystal. If desired, an alternative or an additional wash with relatively pure water may be provided to further remove occluded brine from the ice. In order to conserve material and energy in the system, the washings may be recirculated to the freezing operation. The refrigerant vapor is then compressed and employed in melting the ice to produce the desired fresh water product.

When water is removed from the sea water by hydrate formation, the vaporizing refrigerant forms a hydrate in the freezing step and this hydrate is later decomposed by the refrigerant vapors.

The product water resulting from the melting process and residual brine from the freezing process are both at significantly lower temperatures than the feed and may be used to cool the heat transfer medium so that it may be reused to cool additional incoming sea water. This may be accomplished by conventional indirect contact of the brine or water, or both, with the heat transfer medium. It may also be accomplished by direct contact of brine and water separately with refrigerant when the refrigerant is employed as the initial heat transfer medium. Preferably, however, the supplemental heat transfer liquid employed in countercurrent direct contact to precool incoming sea water is cooled by direct contact with product brine and water separately and is reused in the cooling step.

In the freezing and melting steps refrigerant tends to dissolve in the brine and water product streams and should be recovered from these streams in order to provide an economic process.

In order to free the refrigerant stream of dissolved gas, at least a part of the refrigerant in the cycle may be absorbed into a fluid in which it is soluble and in which the gaseous components of air are relatively insoluble. In this way, only the refrigerant becomes dissolved in the absorbing liquid and inert gases may be vented from the system without loss of valuable refrigerant. Simple distillation or stripping means may be used to separate the refrigerant from the absorbing liquid for return to the system at a higher temperature, and higher pressure, if desired, for use in melting the ice. Absorption and distillation may be used in conjunction with vapor compression to provide vapor for the melting step in order to recover the refrigerant dissolved in the product brine and water streams. These streams may be contacted with a liquid having a low miscibility with water and in which the refrigerant is sufficiently soluble so that it is extracted from the aqueous phase into the water-immiscible liquid. Refrigerant may be then recovered from this liquid by stripping or distillation. This separation may be conducted simultaneously with the separation of refrigerant from the liquid in which it is absorbed to free the system of dissolved gases. Thus, the absorbing liquid and the water-immiscible liquid may be the same. Furthermore, the water-immiscible liquid and the liquid employed as the refrigerant absorber may be the same, and the steps of warming the residual brine and product water may be combined with extraction of the products to remove dissolved refrigerant.

When the incoming sea water is precooled in direct contact with the immiscible liquid a small portion of the liquid contaminates the water. When the water is transferred to the freezing operation, the water-immiscible liquid tends to carry over into the refrigerant vapor phase and thus further contaminates the refrigerant. The refrigerant and heat transfer medium may be separated in the stripping or distillation step.

Although the above illustration has been given with respect to the recovery of water from sea water, the process of this invention is equally applicable to the purification and concentration of other solutions not only by freezing to recover solvent, but also by hydrate formation to concentrate the solution.

The choice of volatile refrigerant for the present invention is determined by the density of the solution being processed, the density of the solid phase formed, and the density of the residual liquid. In the preferred embodiment of this invention, in which water is separated from a saline solution wherein the saline solution always has a density greater than 1, the refrigerant should have a density between 0.92 and the density of residual brine. Three classes of refrigerants may be employed. These are pure compounds capable of vaporizing under the proper conditions to cause partial freezing of the saline; non-azeotropic blends of refrigerants giving the required density and which are capable of sufficient vaporization to freeze the requisite portion of the salt water; and azeotropes having sufficient volatility.

In the operation of the freezer atmospheric pressure, sub-atmospheric pressure, or super-atmospheric pressure may be employed, depending upon the volatility of the particular refrigerant.

When the refrigerant is an azeotrope or a single compound, it is preferred to pre-mix refrigerant and pre-cooled sea water and simultaneously inject the mixture into the freezing vessel to cause flash evaporation of the refrigerant.

The refrigerant vapor is then withdrawn and compressed in a subsequent step in the process for use in melting the ice formed, and the ice-brine mixture is separated by floatation or gravitation through a layer of the refrigerant held at a suitable temperature and pressure so that no further ice formation occurs. The ice, with occluded brine, floats to the top of the refrigerant layer while the bulk of the residual brine sinks below the refrigerant. The ice may be subsequently washed and then melted with compressed refrigerant vapors.

When employing a non-azeotropic refrigerant blend, the composition of the vapor may not be the same as the initial composition of the liquid refrigerant in the freezer. In order to maintain the proper density in the liquid refrigerant layer, a portion of the liquid may be constantly withdrawn and warmed in contact with unprocessed sea water, and added to the melter for use in conjunction with compressed refrigerant vapors for melting the ice. By adjusting the quantity of liquid refrigerant withdrawn from the freezer to be re-mixed with refrigerant vapors in the melter, the refrigerant composition in the freezer and melter can be made to remain substantially constant.

Another method of controlling the density of a non-azeotropic liquid refrigerant mixture is to constantly add to the freezer a mixture which is rich in the low boiling component of the mixture to compensate for the difference of composition between the liquid and vapor phase.

In one embodiment of this invention, the freezing vessel may be operated as a freezer, washer, and melter if at least two such vessels are provided. While sea water is frozen in the first vessel, the melting operation is conducted in the second vessel. In this embodiment of the invention a quantity of the refrigerant at the proper temperature is charged into the freezing vessel with a quantity of sea water to be frozen, the saline is frozen, brine removed therefrom, and the resulting ice washed in any desired fashion. Any refrigerant remaining is removed into the second vessel and warmed refrigerant vapors are then returned to the first vessel for melting the ice while freezing is commenced in the second vessel. This embodiment of the invention, employing two vessels in this instance, is illustrated in FIG. 3.

As pointed out above, the refrigerant may be a pure compound or a mixture either blended to suit the needs of a particular cycle, or an available blend having the proper density at the freezing temperature of the solution being treated. It is, of course, preferred that the refrigerant be relatively insoluble in the solution being treated.

Particular refrigerants and refrigerant compounds applicable to the separation of fresh water from saline solutions include methyl chloride and other halohydrocarbons having densities between 0.92 and the density of residual brine; blends of aliphatic and olefinic hydrocarbons having up to 4 carbon atoms as one component and a more dense component to bring the liquid refrigerant to the proper density. Table 1 illustrates examples of suitable compounds which may be blended to prepare refrigerants useful in the process of this invention, while Table 2 illustrates examples of mixtures prepared from these and other compounds and having the proper density for separating ice from residual brine.

When conducting processes other than concentration of aqueous solutions refrigerants having the appropriate density may be blended or selected from other compounds.

Table 1

| Name | Formula | Vapor Press. (atm.) at 32° F. or B.P. at 1 atm. | Density |
| --- | --- | --- | --- |
| Methyl Chloride | $CH_3Cl$ | 2.5 | 0.993. |
| Freon 12 | $CCl_2F_2$ | 3.0 | 1.294. |
| Freon 22 | $CHCl_2F_2$ | 4.9 | 1.177. |
| Freon 115 | $CClF_2CF_3$ | 4.2 | 1.258. |
| Propane | $C_3H_8$ | 5.0 | 0.500. |
| n-Butane | $C_4H_{10}$ | 1.015 | 0.579. |
| Isobutane | $C_4H_{10}$ | 1.54 | 0.557. |
| Propene | $C_3H^6$ | 5.72 | 0.515. |
| Butene-1 | $C_4H_8$ | 1.28 | 0.595. |
| Butene-2 | $C_4H_8$ | 0.908 | 0.62 (ave). |
| Isobutene | $C_4H_8$ | 1.31 | 0.594. |
| Freon 11 | $CCl_3F$ | 0.41 | 1.568 (at 5° F.). |
| Freon 21 | $CHCl_2F$ | 0.67 | 1.446 (at 5° F.). |
| Freon 114 | $C_2Cl_2F_4$ | 0.87 | 1.570 (at 5° F.). |
| Methylene Chloride | $CH_2Cl_2$ | 104° F. | 1.336 (at 68° F.). |
| Pentane | $C_5H_{12}$ | 89.6° F. | 0.63. |

Table 2

| Light Component | | Heavy Component | | Vapor Press. at 32° F. (atm.) |
| --- | --- | --- | --- | --- |
| Weight Percent | Mol. Fract. | Weight Percent | Mol. Fract. | |
| Propane 17 | 0.286 | Freon 22 | 83 | 0.714 | 4.9 |
| Propene 22 | 0.433 | Freon 12 | 78 | 0.567 | 3.9 |
| Propene 23 | 0.524 | Freon 115 | 77 | 0.476 | 5.0 |
| Propane 25 | 0.43 | Methylene Chloride. | 75 | 0.57 | 2.3 |
| Isobutane 37 | 0.63 | Freon 114 | 63 | 0.37 | 1.3 |
| Isobutane 30 | 0.481 | Freon 12 | 70 | 0.519 | 2.2 |

The supplemental heat-transfer medium or absorber fluid employed in the process should be a relatively low vapor pressure inert liquid. For example, when processing sea water to produce fresh water, the heat-transfer medium may be a liquid higher aliphatic hydrocarbon, which is a liquid in the operating temperature and pressure range (15–80° F.), such as hexane, heptane, octane, or commercially available mixtures of aliphatic, olefinic, naphthenic, and aromatic hydrocarbons derived from crude petroleum or coal tar. Kerosene and gasoline are examples of such petroleum-derived liquids suitable as a heat-transfer medium. In addition, other immiscible organic liquids such as vegetable "oils" may be employed.

When treating sea water or other saline solutions by freezing to recover concentrated brine and relatively demineralized water, it is advantageous to pre-treat the incoming saline solution. For example, the saline may be freed of dissolved gases by vacuum deaeration. Prior to the deaeration, or if deaeration is not employed, it is advantageous to blow air through the solution to displace carbon dioxide which may be dissolved in the water. As an alternate to blowing with air, carbon dioxide may be removed by adding lime to the saline water and removing any precipitate formed.

In the accompanying drawings miscellaneous pumps, valves, control units, and several optional cooling operations have not been illustrated since the drawings are intended as a schematic representation of the process of this invention.

With specific reference to the accompanying drawings, FIG. 1 illustrates an embodiment of this invention for recovering demineralized water from sea water. Unprocessed sea water from storage or other convenient source enters a deaerator 11 through line 10, where it is stripped, as far as economically practical, of dissolved components of air, such as oxygen, nitrogen, and carbon dioxide. It is not necessary to employ a deaerator in the process of this invention as provision may be made in a subsequent portion of the process for removing dissolved inert gases. When the deaerator is employed, sea water leaves through line 12 and enters the pre-cooler 13 where it is cooled on direct contact with relatively low vapor pressure liquid, such as heptane. Heptane enters the pre-cooler through line 14 and leaves the pre-cooler through line 15. The water leaves the pre-cooler through line 16 to the freezer 17 after being cooled to about the freezing point. In the freezer 17 the cooled sea water flows into a body of vaporizable refrigerant 18 such as a mixture of about 17 weight percent propane and 83 weight percent Freon 22, entering the freezer 17 through line 19 as a liquid preferably at about the freezing point of the residual brine. In the freezer 17 the refrigerant mixture is partially vaporized and vapors exit via line 20 to the compressor 21. Vaporization of the refrigerant causes a portion of the water in the sea water to freeze. Since the brine has a greater density than the refrigerant it forms a layer 22 below the refrigerant layer 18, while the crystals of ice with some occluded brine float above the refrigerant layer 18 and form the ice layer 23. Residual brine is removed via line 24, while ice is taken via line 25 to a washer 26 where occluded brine may be removed by washing with either unprocessed sea water, fresh water, or a saline solution less concentrated than the residual brine. These washings may be collected and returned to the freezer 17. The washed ice is removed to the melter 27 via line 28, preferably as a slurry in water. Any suitable arrangement of freezer-washer-and-melter may be used in the process of this invention and the vessels 17, 26, and 27 may represent one or more of each unit or, in certain instances, one or more of the vessels may be eliminated, the functions being combined into a single vessel, as will be described herein.

The vessel 17 is maintained at a pressure which will fix the temperature to that of the freezing point of the desired residual brine. In this way, a liquid layer of refrigerant is maintained in the freezing vessel through constant addition of refrigerant through line 19. The freezer is adjusted so that a temperature of about 24.8° F. is maintained. At this temperature about one-half the incoming sea water is frozen. The sea water is injected through line 16 into the layer of refrigerant 18 in the freezer 17. Since the propane component of the refrigerant has a higher vapor pressure than that of Freon 22, as propane is removed from the layer 18, the density of the liquid refrigerant is correspondingly raised. To compensate for this change in refrigerant composition, an amount of liquid corresponding to the loss in propane by vaporization is withdrawn from the freezer through line 65. The flow of refrigerant through line 19 is adjusted to compensate for the vaporization of propane and Freon 22, plus the amount withdrawn through line 65. The refrigerant withdrawn through line 65 is ultimately recombined with refrigerant vapors in the melter 27. However, since the refrigerant leaving the freezer via line 65 is too cold to employ in the melting operation, it is used to precool additional sea water in the heat exchanger 66, thus bringing the refrigerant to a temperature above 32° F. Cold liquid refrigerant enters the heat exchanger 66 through line 65 and is warmed in direct contact with deaerated sea water entering through line 67. The warm liquid refrigerant is taken from the heat exchanger 66 through line 68 to the melter 27, while cool sea water is taken from the heat exchanger 66 through line 69 and combined with cold sea water from the pre-cooler 13 in line 16 for use in the freezer 17.

By removing a portion of the refrigerant from the freezing vessel, warming and mixing this refrigerant with compressed refrigerant vapor in the melter, the total compressor load needed to melt the ice formed is minimized.

The refrigerant vapor produced in the freezer 17 passes into the compressor 21 via line 20, along with refrigerant vapor from the flash tank 48 in line 51. The vapors are compressed and warmed in the compressor 21 and then flow through line 29 to be split into major and minor portions. The majority of the output from the compressor 21 flowing through line 29 is taken through line 49 to the melter 27 where the vapors are combined with warmed liquid refrigerant from the heat exchanger 66 entering through line 68. Condensation of the refrigerant vapors entering from line 49 is effected by contact with ice in the melter entering through line 28. Condensation of the refrigerant vapors causes melting of the ice and thus water and completely liquefied refrigerant are produced in the melter. Product water is removed from the melter through line 58 and liquid refrigerant is removed from the melter 27 via line 50 for ultimate return to the freezer.

A small part of the compressed refrigerant is taken through line 30 to the absorber 31 where it is dissolved in liquid heptane entering line 32. A complete absorption of the refrigerant in the heptane is accomplished by controlling the flow and temperature, and may be achieved by spraying the heptane into the absorption column. The absorption column is preferably cooled with an internal circulating cooling fluid such as sea water. Any gases not absorbed into the heptane in absorber 31 are released from the system through the vent 33. In this manner, dissolved air released from the water at any step of the operation is released from the system, the solubility of the air components being much lower in the heptane than in the refrigerant.

The mixture of refrigerant and heptane produced in the absorber 31 passes to the stripping operation in steam still 34 via lines 35 and 36, and heat exchanger 37, where the mixed liquid is warmed. The stripper 34 is essentially a distillation unit which may operate under pressure and which is heated, for example, by steam coils to effect a separation of the heptane and refrigerant and, if desired, to obtain refrigerant vapors at a higher pressure than they leave the freezer 17. For best operation of the still 34, a portion of the refrigerant may be refluxed through line 39 and line 40 via the condenser 41. Relatively pure refrigerant leaves the stripper 34 via line 38. The greater majority of the refrigerant vapors are returned to the freezer 17, via line 42, cooler 43, line 44, condenser 45, lines 46 and 47, flash tank 48, and line 19. Cooler 43 and condenser 45 may be cooled in any convenient manner.

Liquid refrigerant resulting from the melting of ice in the melter 27 is combined with liquid refrigerant from the condenser 45 in line 47 after leaving the melter through line 50. In order to maintain the proper temperature in the freezer, a part of the refrigerant in tank 48 may be flashed as a vapor through line 51 to the compressor 21 via line 20.

The still bottoms produced in the stripper 34 are essentially pure liquid heptane and are removed from the stripper through line 52 and cooled in the heat exchanger 37. The effluent from heat exchanger 37, passing through line 53, separates into two streams 54 and 55. The stream 54 is reused in the absorber 31, while that portion flowing through line 55 is combined with part of the heptane from precooler 13 flowing through line 15, in line 56, and is used in the product water contactor 57. In the water contactor 57 product water resulting from the melting of ice is carried via line 58 to the product water contactor 57 where it absorbs heat from the heptane entering through line 56. The warmed water leaves the contactor through line 59 for storage, use, or further processing. The cooled heptane leaves the product water contactor via line 62. Concentrated brine resulting from the freezing process is conducted from the freezer 17 via line 24 to the brine contactor 60, where it is warmed in direct contact with the heptane entering through lines 15 and 61. Warmed brine leaves the contactor through line 63 for further processing or disposal. Cooled heptane leaves the contactor 60 through line 64 and is combined with the effluent from the water contactor 57 from line 62. The combined effluent from the brine contactor 60 and water contactor 57 join in line 14 and are used to precool additional incoming sea water in the precooler 13, thus completing the cycle. Thus, provision has been made for conserving the considerable "cold" produced in the freezer and at the same time providing a method for separating ice from residual brine produced in the freezer by means of an immiscible liquid layer of intermediate density. In the above process absorption and distillation may completely replace compression of the refrigerant vapors and any desired method may be employed for precooling the incoming sea water and removing impurities from the heat transfer and product streams even though an absorption and distillation operation combined with deaeration of the incoming sea water has been described.

Make-up refrigerant and heptane may be added to the system to compensate for minor losses. Refrigerant is advantageously added from a storage tank into line 46, while heptane lost with effluent products may be added through line 32 for use in the absorber 31.

In the process illustrated in FIG. 2, sea water enters the pre-cooler through line 101 to be cooled to near its freezing point in direct contact with cold liquid refrigerant entering through line 103. The cooled sea water leaves the precooler 102 via line 104 to the freezing and melting operation, while the refrigerant warmed in the precooler 102 exits through line 105 and is split into two portions to be described below. A deaerator may be provided prior to precooler 102 to remove air dissolved in the water. Sea water which has been treated in the precooler 102 passes through line 104 to the freezer 106 where it is partially frozen in direct contact with cold liquid methyl chloride refrigerant, which enters together with the water in line 104 from line 107. The freezing is accompanied by flash evaporation of the liquid refrigerant to form methyl chloride vapors, which vapors are taken through line 108 to the compressor 109.

The mixture of residual brine and ice is removed from the freezer 106 and carried through line 110 to the separator 111 where brine and ice are separated by flotation in a body of liquid refrigerant entering from the melter 112 via line 113. Residual brine is removed from the bottom of separator 111 through line 114 to the brine contactor 123 where it is used to cool liquid refrigerant from the precooler 102. Ice and occluded residual brine are carried from the separator 111 to the washer 115 through line 116. As much residual brine as possible is removed in washer 115 by washing with unprocessed sea water from the precooler 102 entering through line 117. Residual wash water from the washer is recirculated to the freezer through line 118. The ice may also be further subjected to washing with demineralized water to remove any additional occluded brine prior to transfer to the melter 112 and may be slurried in water to facilitate the transfer.

In the melter 112 washed ice, preferably slurried in cold water, enters through line 119 and is melted in direct contact with warm refrigerant vapors entering through line 120 from the compressor 109. In the melting process, refrigerant vapors are condensed to cold liquid and leave the melter through line 113 while water resulting from the melting process leaves the melter 112 through line 121 for subsequent cooling of warm liquid refrigerant in contactor 130. The cold refrigerant liquid stream leaving the melter 112 through line 113 enters the separator 111 for use in removing brine from ice as described above. Liquid refrigerant is constantly removed from separator 111 through line 122 at the same rate as it enters through line 113.

Cold effluent brine from separator 111 is taken through line 114 to the contactor 123 where it is warmed in direct contact with about one-half the warm liquid refrigerant from the precooler 102 entering from line 105 via line 124. Similarly, product water from the melter 112 flows through line 121 to the contactor 130 to be warmed with the rest of the liquid refrigerant from line 105 entering the contactor through line 125. In contactor 123 refrigerant is cooled for reuse in the freezer and precooler while brine is warmed for disposal, use, or further processing. Brine leaves through line 126, while cooled refrigerant is taken out by line 127. In a similar fashion, product water entering contactor 130 is heat exchanged with refrigerant entering through line 125 and product water leaves the contactor 130 through line 131. Cold refrigerant leaving contactor 130 via line 128 is combined with that leaving contactor 123 through line 127 in line 129 for readmission to the precooler 102 and freezer 106, along with the refrigerant in line 122, via line 103.

Although not shown in FIG. 2, it is sometimes necessary to provide several additional devices in the system in order to operate the freezing process for separating water from sea water effectively and economically. For example, most efficient compression may be accomplished by providing, in addition to the primary compressor 109, a secondary compressor to compress to a higher pressure a small portion of the vapors flowing through line 120. Vapors compressed in the secondary compressor may be cooled, completely condensed, and returned to the system through either line 105 or 107. Furthermore, since the process may be operated with or without a deaerator, provision must often be made to vent any inert dissolved gases entering the system with the sea water. In addition to removal of inert gases from the system, provision may also be made to remove any refrigerant dissolved in the effluent products leaving the system through lines 126 and 131. Removal of inerts and extraction of refrigerant from the effluents may be accomplished by the process described in a patent application, Serial No. 97,935, filed March 23, 1961, by John W. Mohlman et al., entitled, "Solution Purification Process" (now U.S. Patent 3,183,679). In general, the process disclosed in the Mohlman et al. application consists of providing contactors for the product streams in which refrigerant is extracted into a high boiling liquid which is immiscible with water. A portion of the refrigerant employed in the freezer-melter cycle is also absorbed into a portion of the immiscible liquid and the combined solution of refrigerant and immiscible liquid separated by stripping. Inert gases are vented from the system through absorption of the refrigerant from the freezer-melter cycle. The process in FIG. 1 of the present application illustrated one method of stream purification as applied to the process of this invention.

Thus, the embodiment of this invention illustrated in FIG. 2 provides for separating brine and ice as a step of the process, utilizing the density of the refrigerant as a means for floating the ice and sinking the residual brine.

Since a small amount of refrigerant may be constantly lost from the system, a provision should be made for a make-up stream. This may be done at any convenient point in the cycle, for example to line 105 before the refrigerant splits into lines 124 and 125. Alternatively, refrigerant may be admitted to the system at any other convenient point.

Referring now to FIG. 3, an embodiment of this invention employing a combination batch-continuous process is illustrated by the use of two vessels employed sequentially for the freezing and melting operation. The arrangement of the vessels and their use may be applied to either the supplemental heat-transfer liquid system illustrated in FIG. 1, or the single heat-transfer-refrigerant system illustrated in FIG. 2. In addition, the supplemental heat-transfer steps may be accomplished by conventional shell and tube heat-transfer means. Precooled sea water enters the freezer-melter operation through line 201 and passes to either vessel 202 or 203 depending on which is presently employed as the freezer. As illustrated by FIG. 3, freezing may first take place in the vessel 202, in which instance the precooled sea water enters a body of liquid refrigerant 204 through the line 205. In this case, the valve 206 is open, permitting the flow into the vessel 202 while the valve 207 in line 208 is closed so that no sea water enters the vessel 203 during the melting operation. In this embodiment of the invention it is preferred to use refrigerant having an essentially constant boiling point such as the blend of propane and Freon 22 described above. At the beginning of the operation cooled liquid refrigerant is pumped via valve 209 and line 210 through line 211 into vessel 202. When sufficient refrigerant has entered the system, valve 209 is closed and thereafter used only for make-up purposes. As refrigerant is charged to the vessel 202, the sea water enters through line 205 and by maintaining the proper pressure in the freezing vessel, the refrigerant vaporizes, forming ice, residual brine and vapors of the refrigerant. Pressure is maintained at such a point that a body of liquid refrigerant always remains in the freezer. As ice forms, it floats above the refrigerant layer 204 and forms an ice layer 212 with some occluded brine. Residual brine falls beneath the surface of the refrigerant and forms the brine layer 213. If desired, brine may constantly be removed from the vessel 202 through line 235 with valve 214 open, to be admitted to the brine contactor through line 215. Refrigerant vapor formed during the freezing is removed from the vessel 202 through line 216 while valve 217 is open. At this point, the valve 218 is closed so that no refrigerant vapor flows directly back to the vessel 203. Refrigerant vapors from line 216 are taken to the compressor via line 219 for compression, and returned via line 220 to the melting operation in vessel 203. While using the vessel 202 as the freezer, the valve 221 remains closed. After a predetermined amount of sea water has been partially frozen in the vessel 202 and all the residual brine removed through line 231, only ice and liquid refrigerant remain in the vessel. At this time the valve 217 is closed and liquid refrigerant is taken through line 211, open valve 223, and line 224 to the vessel 203 to begin the freezing operation in vessel 203, thus leaving only ice and refrigerant vapor in the vessel 202. The ice may be washed with additional sea water entering through line 205, or the first portion of the ice melted in the melting operation may be rejected to remove occluded brine. If desired, the first melting and the sea water wash may be returned to the freezing operation. When this system has been in operation for more than one cycle while the freezing operation is conducted in vessel 202, a simultaneous melting operation is conducted in the vessel 203. Warm compressed refrigerant vapor enters the vessel 203 through lines 220 and 225 through open valve 226. The warm refrigerant vapors are caused to condense on the ice in vessel 203 from the previous freezing operation, thus melting the ice to form product water. Product water is removed from the vessel 203 through line 227 and open valve 228 for use in the product water container via line 229. When the vessel 202 is employed as the melter, the valve 228 is closed, valve 230 is open, and the product water flows to line 229 through line 231. Liquid refrigerant produced from the vapors in the vessel 203 is then used for the next freezing operation in vessel 203 and after compression in the next freezing cycle any remaining liquid refrigerant is removed, following the removal of all residual brine. The residual brine is removed from the vessel 203 when it is employed as the freezer through line 232, at which time the valve 233 is open. Remaining cold liquid refrigerant used to separate brine and ice is removed from the vessel 203 through line 224 and open valve 234 for return to the vessel 202.

Thus, the vessel 202 is used sequentially as a freezer-washer and then melter while the vessel 203 is used as the melter and then the freezer-and-washer.

The operations shown in FIGS. 1, 2 and 3 are illustrative of the practice of this invention independent of start-up procedure. When initially freezing a solution such as sea water, refrigerant vapors are produced and compressed and must be cooled for reuse in the freezing portion of the process before any ice is available for melting. Therefore, supplemental refrigeration is required upon start-up. This may be accomplished by an auxiliary propane refrigeration unit substituted during start-up for the melting vessel.

As used throughout this specification, "floatation" is intended to mean a process by which a less dense phase floats upon a phase of intermediate density while a more dense phase sinks through the intermediate density phase.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a process for conversion of a first solution to be treated to a solution of greater concentration than said first solution and to solids of a specific gravity less than that of said first solution, the process being of the class wherein said first solution is contacted in a chamber directly with a treating liquid which is substantially immiscible with and of higher vapor pressure than said first solution whereby a substantial part of the said treating liquid volatilizes in the presence of said first solution to form vapor and a substantial part of said first solution is converted to said solution of greater concentration and to said solids, that improvement which comprises employing a species of said treating liquid having a specific gravity less than that of said first solution and greater than that of said solids, maintaining a layer of said treating liquid in said chamber between said solids and said more concentrated solution, and withdrawing said more concentrated solution from below said layer.

2. In a refrigeration process for conversion of a first aqueous solution to be treated to a product solution of greater concentration than said first solution and to a product solution of less concentration than said first solution, the process being of the class wherein said first solution is cooled in a chamber by direct-contact with a liquid refrigerant substantially immiscible with and of higher vapor pressure than said first solution, whereby a substantial part of said refrigerant volatilizes to form vapor, and a substantial part of said first solution is converted to said more concentrated solution and to solids which when melted produce said less concentrated solution, that improvement which comprises employing a species of said refrigerant having a specific gravity less than that of said first solution and greater than that of said solids, maintaining a layer of said liquid refrigerant in said chamber between said solids and said more concentrated solution, wtihdrawing said more concentrated solution from below said layer, and thereafter melting said solids out of the presence of said more concentrated solution below said layer by contacting said solids with said vapor.

3. The process of claim 2, wherein said first solution is sea water.

4. The process of claim 2, wherein said refrigerant is a blend of a lower aliphatic hydrocarbon and a high density component.

5. In a process for separating less concentrated solution from a solution of intermediate concentration by (1) freezing said solution of intermediate concentration in a chamber by direct contact with a vaporizable liquid refrigerant to form (a) cool refrigerant vapors, (b) solids, and (c) residual solution; (2) separating said solids from said residual solution; (3) melting said solids in direct contact with compressed refrigerant, thereby forming cold liquid refrigerant; and (4) recirculating said cold liquid refrigerant to step (1), the improvement which comprises maintaining within said chamber a layer of liquid refrigerant having a density intermediate the respective densities of said solids and said residual solution, said liquid layer serving to separate said solids from said residual solution.

6. In a process for obtaining relatively demineralized water from an aqueous solution by (1) freezing said solution in a chamber by direct contact with a vaporizable liquid refrigerant to form cool refrigerant vapors, ice and residual brine, (2) separating said ice from said residual brine, and (3) melting said ice in direct contact with compressed refrigerant vapor to form water and cold liquid refrigerant, the improvement which comprises maintaining within said chamber a layer of liquid refrigerant having a density intermediate the respective densities of said solids and said residual solution, said liquid layer serving to separate said solids from said residual solution.

7. In a process for separating relatively demineralized water from an aqueous solution by (1) precooling said solution to near the freezing point in direct contact with an immiscible heat-transfer liquid, (2) freezing said solution in a chamber by direct contact with a vaporizable liquid refrigerant to form cool refrigerant vapors, ice, and more concentrated residual solution, (3) separating said ice from said more concentrated residual solution, (4) washing said ice to remove occluded residual solution, (5) melting said ice in direct contact with compressed refrigerant vapors to form water and cold liquid refrigerant, (6) recirculating said cold liquid refrigerant to step (2), and (7) directly contacting said residual solution and said water separately with said heat-transfer liquid from step (1), the improvement which maintaining within said chamber a layer of liquid refrigerant having a density intermediate the respective densities of said solids and said residual solution, said liquid layer serving to separate said solids from said residual solution.

8. The process of claim 7, wherein said heat-transfer liquid is said refrigerant.

9. A continuous process for obtaining potable water from sea water which comprises precooling sea water to near its freezing point in direct contact with octane, partially freezing said sea water in a chamber by direct contact with a cold liquid refrigerant comprising 54 weight percent methyl bromide and 46 weight percent butane to form cool refrigerant vapor, ice, and residual brine, maintaining a layer of said liquid refrigerant in said chamber thereby separating said brine and said ice, washing said ice, warming said cool refrigerant vapor, melting said ice in direct contact with said warm refrigerant vapor to form cold liquid refrigerant and water, and contacting said water and said residual brine with octane from the precooling of said sea water to cool said octane for cooling additional sea water, and freezing additional cooled sea water with said cold refrigerant liquid produced in forming said water.

References Cited by the Examiner

UNITED STATES PATENTS

| 2,997,856 | 8/61 | Pike | 62—58 |
| 3,017,751 | 1/62 | Hawkins | 62—58 |
| 3,070,969 | 1/63 | Ashley | 62—58 |

FOREIGN PATENTS

| 217,766 | 10/58 | Australia. |
| 70,507 | 6/46 | Norway. |

OTHER REFERENCES

Gilliland: "Fresh Water for the Future," Industrial and Engineering Chemistry, volume 47, Number 12, December 1955, pages 2410–2422. 62–123 (Cy. in Sci. Library).

Saline Water Conversion Report for 1957, United States Dept. of Interior, January 1958, pages 62 and 63. Copy in Grp. 180 library.

NORMAN YUDKOFF, *Primary Examiner.*

ROBERT A. O'LEARY, *Examiner.*

UNITED STATES PATENT OFFICE
CERTIFICATE OF CORRECTION

Patent No. 3,213,633                          October 26, 1965

Ludwig Rosenstein et al.

It is hereby certified that error appears in the above numbered patent requiring correction and that the said Letters Patent should read as corrected below.

Column 5, Table 1, under the heading "Formula", line 6 thereof, for "$O_4H_{10}$" read -- $C_4H_{10}$ --; same table, under the same heading, line 8 thereof, for "$C_3H^6$" read -- $C_3H_6$ --; same column 5, line 69, for "inevntion" read -- invention --; column 9, line 42, for "illustrated" read -- illustrates --; column 10, line 51, for "container" read -- contactor --; column 11, line 49, for "wtihdrawing" read -- withdrawing --; column 12, line 27, after "which" insert -- comprises --.

Signed and sealed this 9th day of August 1966.

(SEAL)

Attest:

ERNEST W. SWIDER
Attesting Officer

EDWARD J. BRENNER
Commissioner of Patents